United States Patent
Avila (10) Patent No.: US 9,920,977 B1
(45) Date of Patent: Mar. 20, 2018

(54) ICE CHEST OR COOLER WITH DETACHABLE DRAWERS

(71) Applicant: Aldo Avila, Mesa, AZ (US)

(72) Inventor: Aldo Avila, Mesa, AZ (US)

( * ) Notice: Subject to any disclaimer, the term of this patent is extended or adjusted under 35 U.S.C. 154(b) by 0 days.

(21) Appl. No.: 15/431,945

(22) Filed: Feb. 14, 2017

(51) Int. Cl.
| F25D 3/08 | (2006.01) |
| F25D 23/12 | (2006.01) |
| F25D 3/06 | (2006.01) |
| F25D 25/02 | (2006.01) |
| B62B 1/12 | (2006.01) |
| F16B 5/00 | (2006.01) |

(52) U.S. Cl.
CPC .............. *F25D 23/12* (2013.01); *B62B 1/125* (2013.01); *F16B 5/0032* (2013.01); *F25D 3/06* (2013.01); *F25D 25/025* (2013.01); *F25D 2400/38* (2013.01)

(58) Field of Classification Search
CPC ......... F25D 23/12; F25D 3/06; F25D 2400/38
See application file for complete search history.

(56) References Cited

U.S. PATENT DOCUMENTS

| 6,763,678 B2 | 7/2004 | Harper |
| 6,895,778 B1 | 5/2005 | Ackerman |
| 6,966,450 B2 | 11/2005 | Askew |
| D525,084 S | 7/2006 | Willis |
| 7,415,794 B1 * | 8/2008 | Thompson ............. A01K 97/06 206/315.11 |
| D609,059 S * | 2/2010 | Paslawski ...................... D7/332 |
| 8,256,242 B1 | 9/2012 | Evans |
| 8,863,546 B2 | 10/2014 | Oberweis |
| 9,108,790 B2 * | 8/2015 | Daley .................. B65D 81/361 |
| 9,726,415 B1 * | 8/2017 | Spalti ........................ F25D 3/08 |
| 2002/0125668 A1 * | 9/2002 | Sims ........................ B62B 1/18 280/47.26 |
| 2004/0262319 A1 | 12/2004 | Fisher |
| 2006/0288730 A1 | 12/2006 | Shill |
| 2007/0137245 A1 * | 6/2007 | Ward ........................ F25D 3/06 62/457.7 |
| 2012/0211499 A1 * | 8/2012 | Clement ................ A01K 97/20 220/592.2 |
| 2015/0159938 A1 * | 6/2015 | Weckerly ................ F25D 23/12 381/334 |
| 2017/0043906 A1 * | 2/2017 | Ravenscraft, Jr. ........ B62B 1/10 |
| 2017/0101301 A1 * | 4/2017 | Volin .................... B67D 1/0857 |

FOREIGN PATENT DOCUMENTS

WO 2011022729 A2 2/2011

* cited by examiner

*Primary Examiner* — Brian L Swenson
(74) *Attorney, Agent, or Firm* — Kyle A. Fletcher, Esq.

(57) ABSTRACT

The ice chest or cooler with detachable drawers is an organizational kit used with a wheeled cooler. The ice chest or cooler with detachable drawers comprises a plurality of compartmented spaces that can be added to the wheeled cooler for the purpose of separating foodstuffs. The ice chest or cooler with detachable drawers comprises a cabinet, a first container, and a second container. The cabinet attaches to the exterior of the wheeled cooler. The first container and the second container are inserted into the interior of the wheeled cooler.

16 Claims, 6 Drawing Sheets

ICE CHEST OR COOLER WITH DETACHABLE DRAWERS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lighting and heating including iceboxes, more specifically, a portable ice box.

SUMMARY OF INVENTION

The ice chest or cooler with detachable drawers is an organizational kit used with a wheeled cooler. The ice chest or cooler with detachable drawers comprises a plurality of compartmented spaces that can be added to the wheeled cooler for the purpose of separating foodstuffs. The ice chest or cooler with detachable drawers comprises a cabinet, a first container, and a second container. The cabinet attaches to the exterior of the wheeled cooler. The first container and the second container are inserted into the interior of the wheeled cooler.

These together with additional objects, features and advantages of the ice chest or cooler with detachable drawers will be readily apparent to those of ordinary skill in the art upon reading the following detailed description of the presently preferred, but nonetheless illustrative, embodiments when taken in conjunction with the accompanying drawings.

In this respect, before explaining the current embodiments of the ice chest or cooler with detachable drawers in detail, it is to be understood that the ice chest or cooler with detachable drawers is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ice chest or cooler with detachable drawers.

It is therefore important that the claims be regarded as including such equivalent construction insofar as they do not depart from the spirit and scope of the ice chest or cooler with detachable drawers. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
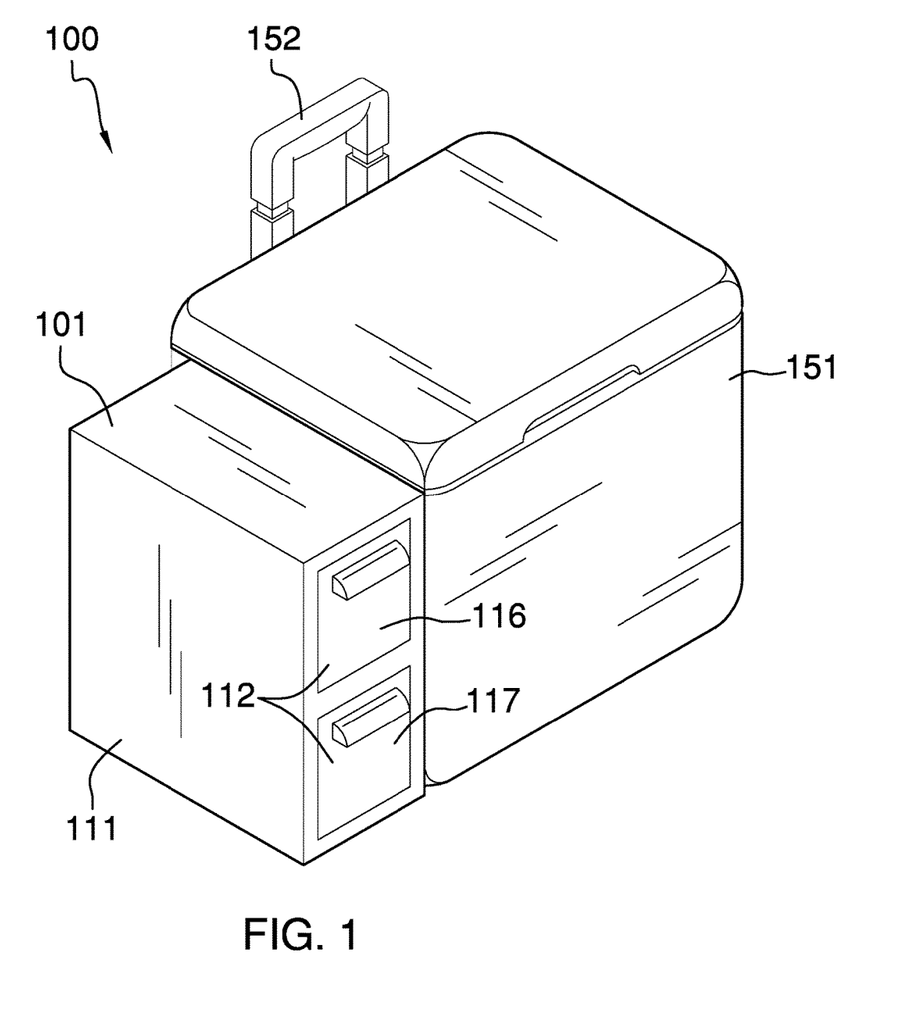
FIG. 1 is a perspective view of an embodiment of the disclosure.
Figure 2:
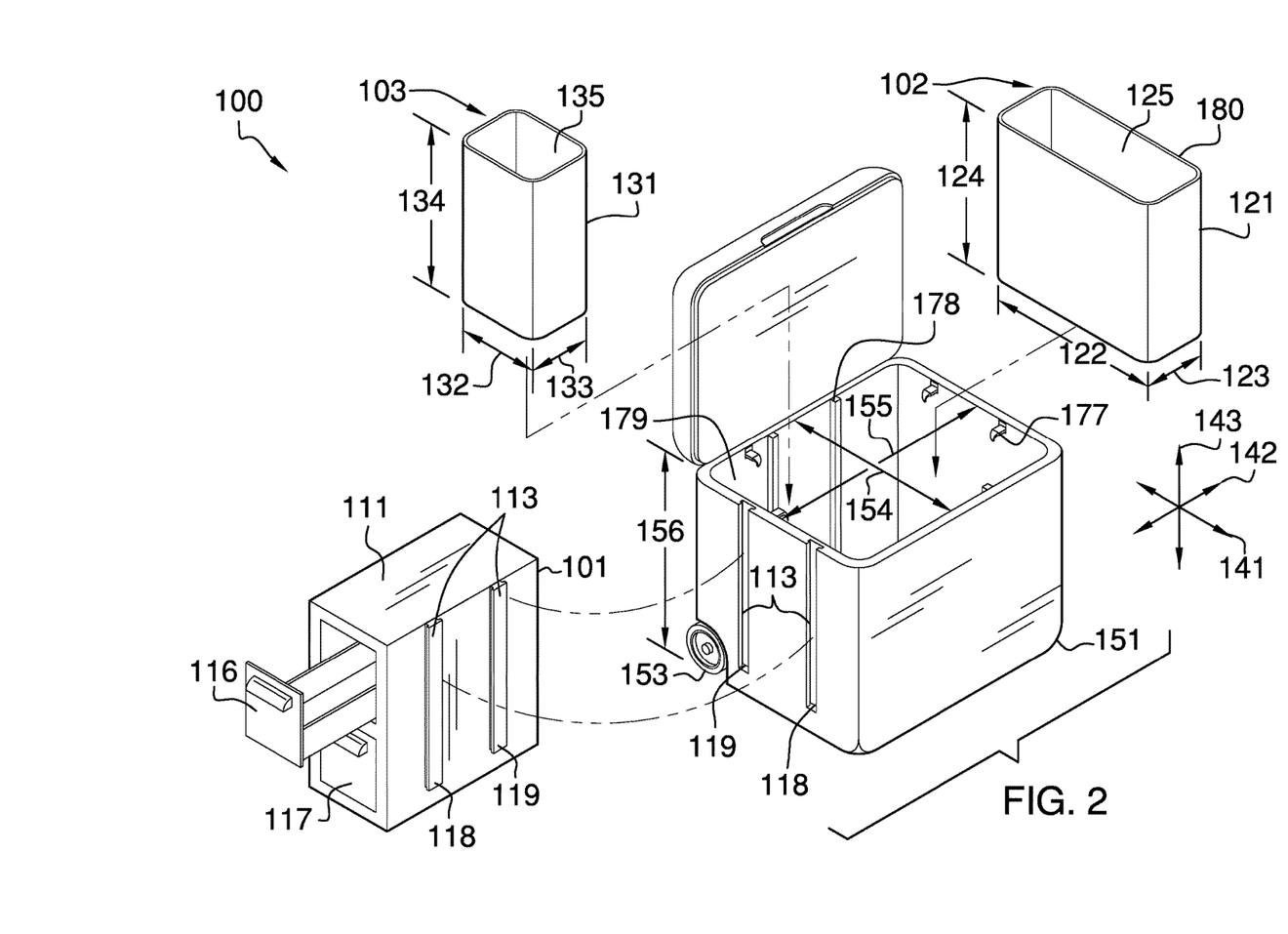
FIG. 2 is an exploded view of an embodiment of the disclosure.
Figure 3:
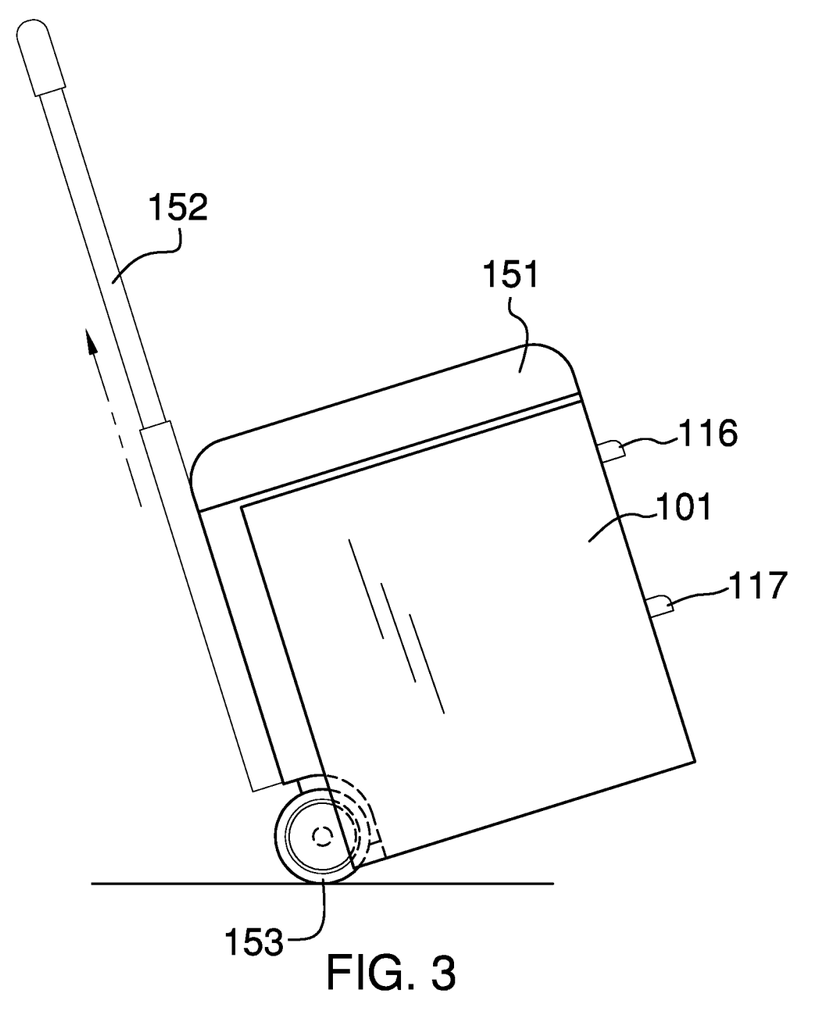
FIG. 3 is a side view of an embodiment of the disclosure.
Figure 4:
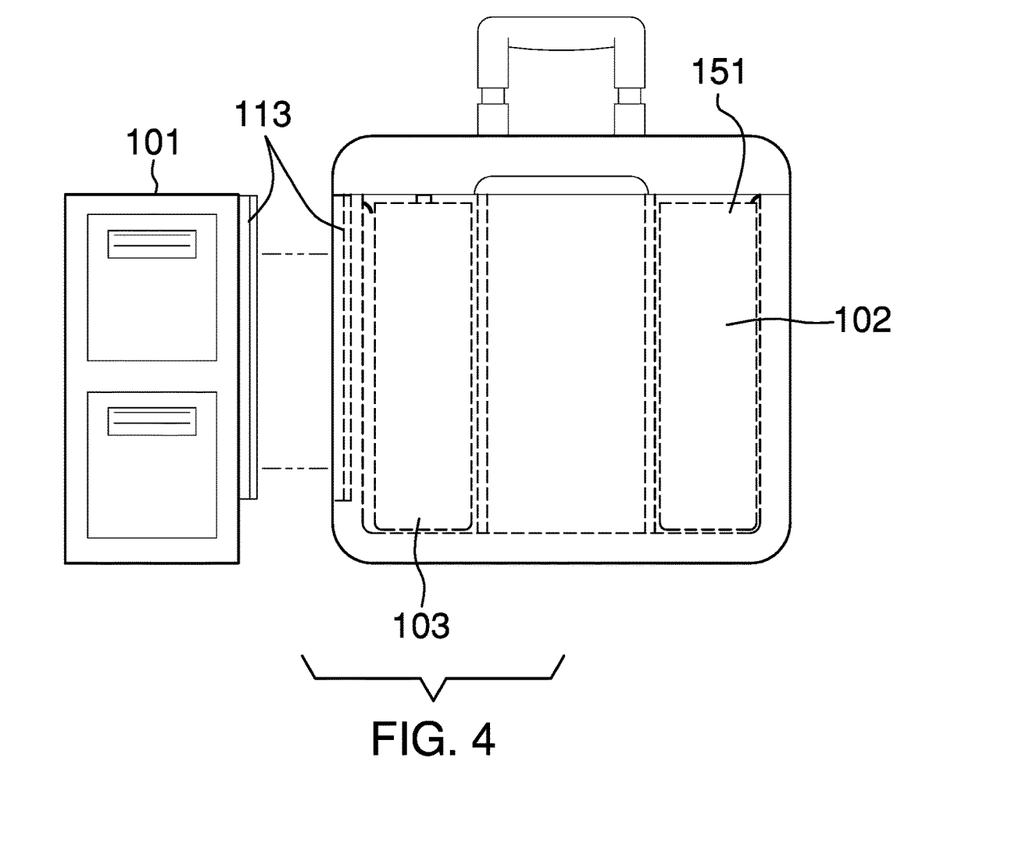
FIG. 4 is a front view of an embodiment of the disclosure.
Figure 5:
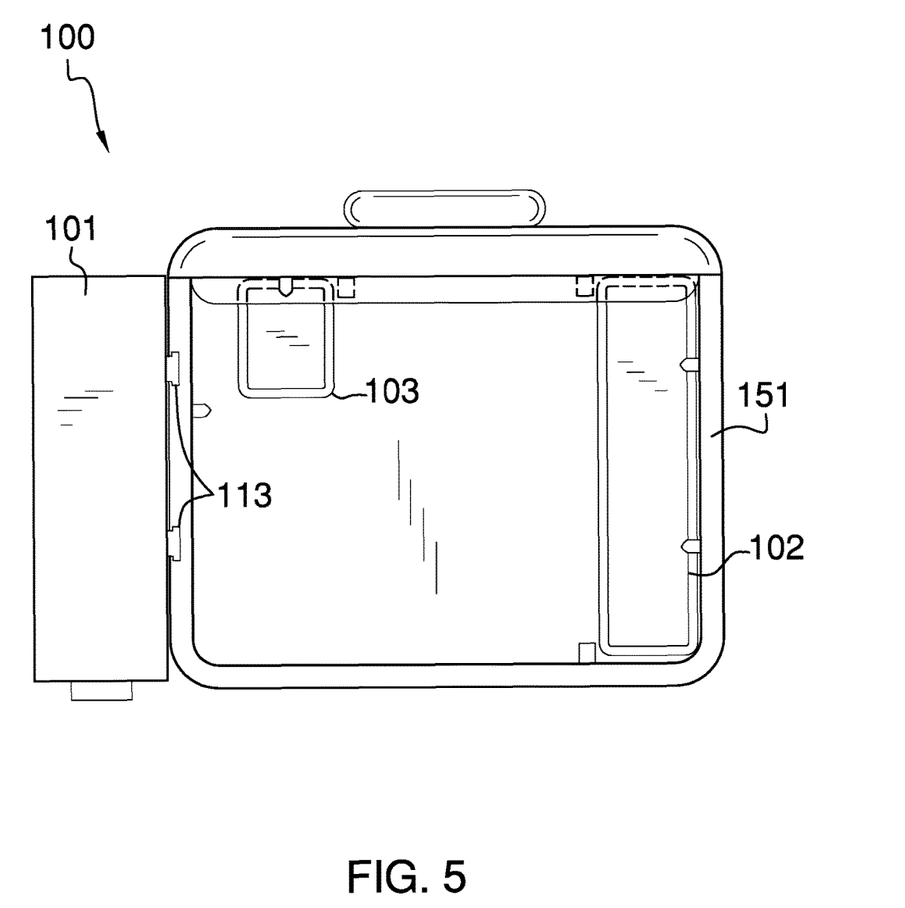
FIG. 5 is a top view of an embodiment of the disclosure.
Figure 6:
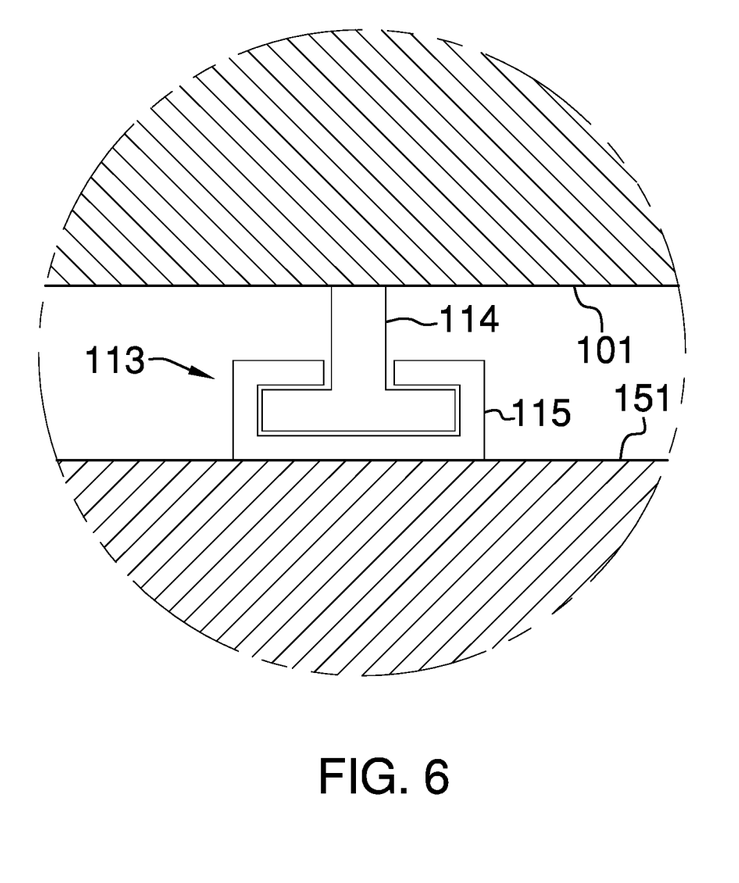
FIG. 6 is a detail view of an embodiment of the disclosure.

Detailed reference will now be made to one or more potential embodiments of the disclosure, which are illustrated in FIGS. 1 through 6.

The ice chest or cooler with detachable drawers 100 (hereinafter invention) is an organizational kit used with a wheeled cooler 151. The wheeled cooler 151 is further defined with a handle 152 and a plurality of wheels 153. The invention 100 comprises a plurality of compartmented spaces that can be added to the wheeled cooler 151 for the purpose of separating foodstuffs. The invention 100 comprises a cabinet 101, a first container 102, and a second container 103. The cabinet 101 attaches to the exterior of the wheeled cooler 151. The first container 102 and the second container 103 are inserted into the interior of the wheeled cooler 151. The invention 100 is further defined with a length 141 direction, a width 142 direction, and a height 143 direction.

The wheeled cooler 151 is a readily and commercially available wheeled cooler that is modified as described elsewhere within this disclosure. The wheeled cooler 151 is further defined with a cooler length 154, a cooler width 155, and a cooler height 156. The cooler length 154 is the span of the wheeled cooler 151 in the length 141 direction. The cooler width 155 is the span of the wheeled cooler 151 in the width 142 direction. The cooler height 156 is the span of the wheeled cooler 151 in the height 143 direction.

The cabinet 101 is a structure formed in the shape of a rectangular block. As shown most clearly in FIG. 1, the cabinet 101 is mounted on the exterior of the wheeled cooler 151. The cabinet 101 provides storage capability for the wheeled cooler 151. The cabinet 101 comprises a frame 111, a plurality of drawers 112, and one or more T track fasteners 113. The frame 111 is the component of the cabinet 101 that physically contains and stores the plurality of drawers 112. Each of the plurality of drawers 112 is a rectangular drawer that is used for storing foodstuffs or foodstuff accessories within the frame 111. Methods to make drawered cabinets 101 are well known and documented in the furniture arts. Each of the one or more T track fasteners 113 is a fastening device that attaches the cabinet 101 to an exterior surface of the wheeled cooler 151 in a removable manner. Each of the one or more T track fasteners 113 comprises a rail 114 and a channel 115. The rail 114 is a T shaped structure that is attached to the frame 111 of the cabinet 101. The channel 115 is a groove that is formed within an exterior wall of the wheeled container 151. The channel 115 is sized such that the rail 114 can be inserted into the channel 115 in order to attach the cabinet 101 to the wheeled cooler 151.

In the first potential embodiment of the disclosure, the plurality of drawers 112 comprises a first drawer 116 and a second drawer 117. The one or more T track fasteners 113 comprises a first T track fastener 118 and a second T track fastener 119.

The first hollow rectangular block 121 is a first hollow containment structure that is formed with a first open face 125 that permits access into the interior of the first hollow rectangular block 121. The first container 102 is stored within interior space of the wheeled cooler 151. The first container 102 comprises a first hollow rectangular block 121. The first hollow rectangular block 121 is further defined with a first length 122, a first width 123, and a first height 124. The first length 122 is the span of the first hollow rectangular block 121 in the length 141 direction. The first width 123 is the span of the first hollow rectangular block 121 in the width 142 direction. The first height 124 is the span of the first hollow rectangular block 121 in the height 143 direction.

The measured outer dimension of the first length 122 is lesser than the measured inner dimension of the cooler length 154 such that the first hollow rectangular block 121 will fit in the interior of the wheeled cooler 151. The measured outer dimension of the first width 123 is lesser than the measured inner dimension of the cooler width 155 such that the first hollow rectangular block 121 will fit in the interior of the wheeled cooler 151. The measured outer dimension of the first height 124 is lesser than the measured inner dimension of the cooler height 156 such that the first hollow rectangular block 121 will fit in the interior of the wheeled cooler 151.

The second hollow rectangular block 131 is a second containment structure that is formed with a second open face 135 that permits access into the interior of the second hollow rectangular block 131. The second container 103 is stored within interior space of the wheeled cooler 151. The second container 103 comprises a second hollow rectangular block 131. The second hollow rectangular block 131 is further defined with a second length 132, a second width 133, and a second height 134. The second length 132 is the span of the second hollow rectangular block 131 in the length 141 direction. The second width 133 is the span of the second hollow rectangular block 131 in the width 142 direction. The second height 134 is the span of the second hollow rectangular block 131 in the height 143 direction.

The measured outer dimension of the second length 132 is lesser than the measured inner dimension of the cooler length 154 such that the first hollow rectangular block 121 will fit in the interior of the wheeled cooler 151. The measured outer dimension of the second width 133 is lesser than the measured inner dimension of the cooler width 155 such that the first hollow rectangular block 121 will fit in the interior of the wheeled cooler 151. The measured outer dimension of the second height 134 is lesser than the measured inner dimension of the cooler height 156 such that the first hollow rectangular block 121 will fit in the interior of the wheeled cooler 151.

The first hollow rectangular block 121 and the second hollow rectangular block 131 are secured to the interior of the wheeled cooler 151 via claw members 177 and/or channel members 178 provided along an interior surface 179 of the wheeled cooler 151. The claw members 177 resemble claws of an animal, and essentially provide a place with which to wedge a top rim 180 of either the first hollow rectangular block 121 and the second hollow rectangular block 131. It shall be noted that the channel members 178 are provided on opposing sides of the wheeled cooler 151. The first hollow rectangular block 121 slides in between the channel members 178 in order to secure the first hollow rectangular block 121 to the interior of the wheeled cooler 151.

The following definitions were used in this disclosure:

Drawer: As used in this disclosure, a drawer is a storage compartment that is designed to slide into and out of a larger object.

Exterior: As used in this disclosure, the exterior is use as a relational term that implies that an object is not contained within the boundary of a structure or a space.

Handle: As used in this disclosure, a handle is an object by which a tool, object, or door is held or manipulated with the hand.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is use as a relational term that implies that an object is contained within the boundary of a structure or a space.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

T Track Fastener: As used in this disclosure, a T track fastener is a fastening device that is used to attach a first object to a second object by sliding the first object on to the second object. The T track fastener further comprises a rail and a channel. The rail is attached to the first object and the channel is attached to the second object such that the first object is attached to the second object when the rail is inserted into the channel.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An accessory comprising:
a cabinet;
wherein the accessory is an organizational kit used with a wheeled cooler;
wherein the accessory comprises a plurality of compartmented spaces;
wherein the cabinet fastens to the exterior of the wheeled cooler;
wherein the wheeled cooler is a modified wheeled cooler;
wherein the wheeled cooler is further defined with a cooler length, a cooler width, and a cooler height;
wherein the cooler length is the span of the wheeled cooler in the length direction;
wherein the cooler width is the span of the wheeled cooler in the width direction;
wherein the cooler height is the span of the wheeled cooler in the height direction;
wherein the cabinet is a structure formed in the shape of a rectangular block;
wherein the cabinet comprises a frame, a plurality of drawers, and one or more fastening devices;
wherein the frame physically contains and stores the plurality of drawers;
wherein the one or more fastening devices fasten to the frame to the exterior of the wheeled cooler;
wherein each of the one or more fastening devices is a T track fastener;
wherein each of the one or more T track fasteners attach attaches the cabinet to an exterior surface of the wheeled cooler in a removable manner.

2. The accessory according to claim 1
wherein each of the one or more T track fasteners comprises a rail and a channel;
wherein the channel is sized such that the rail inserts into the channel.

3. The accessory according to claim 2 wherein the rail is a T shaped structure that is attached to the frame of the cabinet.

4. The accessory according to claim 3 wherein the channel is a groove that is formed within an exterior wall of the wheeled container.

5. The accessory according to claim 4
wherein the accessory further comprises a first container;
wherein the first container inserts into the interior of the wheeled cooler.

6. The accessory according to claim 5
wherein the first container comprises a first hollow rectangular block;
wherein the first hollow rectangular block is further defined with a first length, a first width, and a first height;
wherein the first length is the span of the first hollow rectangular block in the length direction;
wherein the first width is the span of the first hollow rectangular block in the width direction;
wherein the first height is the span of the first hollow rectangular block in the height direction.

7. The accessory according to claim 6
wherein the measured outer dimension of the first length is lesser than the measured inner dimension of the cooler length such that the first hollow rectangular block will fit in the interior of the wheeled cooler;
wherein the measured outer dimension of the first width is lesser than the measured inner dimension of the cooler width such that the first hollow rectangular block will fit in the interior of the wheeled cooler;
wherein the measured outer dimension of the first height is lesser than the measured inner dimension of the cooler height such that the first hollow rectangular block will fit in the interior of the wheeled cooler.

8. The accessory according to claim 7 wherein the first hollow rectangular block is formed with a first open face.

9. The accessory according to claim 8
wherein the accessory further comprises a second container;
wherein the second container inserts into the interior of the wheeled cooler.

10. The accessory according to claim 9
wherein the second container comprises a second hollow rectangular block;
wherein the second hollow rectangular block is further defined with a second length, a second width, and a second height;
wherein the second length is the span of the second hollow rectangular block in the length direction;
wherein the second width is the span of the second hollow rectangular block in the width direction;
wherein the second height is the span of the second hollow rectangular block in the height direction.

11. The accessory according to claim 10
wherein the measured outer dimension of the second length is lesser than the measured inner dimension of the cooler length such that the first hollow rectangular block will fit in the interior of the wheeled cooler;
wherein the measured outer dimension of the second width is lesser than the measured inner dimension of the cooler width such that the first hollow rectangular block will fit in the interior of the wheeled cooler;
wherein the measured outer dimension of the second height is lesser than the measured inner dimension of the cooler height such that the first hollow rectangular block will fit in the interior of the wheeled cooler.

12. The accessory according to claim 10 wherein the second hollow rectangular block is formed with a second open face.

13. The accessory according to claim 11 wherein the plurality of drawers comprises a first drawer and a second drawer.

14. The accessory according to claim 12 wherein the one or more T track fasteners comprises a first T track fastener and a second T track fastener.

15. The accessory according to claim 14 wherein the cabinet is a structure formed in the shape of a rectangular block; wherein each of the plurality of drawers is a rectangular drawer.

16. The accessory according to claim 15 wherein the first hollow rectangular block and the second hollow rectangular block are secured to the interior of the wheeled cooler via claw members and/or channel members provided along an interior surface of the wheeled cooler; wherein the claw members essentially provide a place with which to wedge a top rim of either the first hollow rectangular block or the second hollow rectangular block; wherein the channel members are provided on opposing sides of the wheeled cooler;

wherein the first hollow rectangular block slides in between the channel members in order to secure the first hollow rectangular block to the interior of the wheeled cooler.

\* \* \* \* \*